United States Patent [19]
Rognmo et al.

[11] 3,826,193
[45] July 30, 1974

[54] METHOD FOR SUPPORTING A ROTATING BODY IN GENERATORS FOR MISSILES AND A SUPPORTING ARRANGEMENT FOR SUPPORTING SUCH BODIES

[75] Inventors: Tore Rognmo; Kvrre Sjotun, both of Kongsberg, Norway

[73] Assignee: A/S Kongsberg Vapenfabrik Kirkegardsveien, Kongsberg, Norway

[22] Filed: Feb. 16, 1973

[21] Appl. No.: 332,818

[52] U.S. Cl. ............... 102/70.2 G, 102/81, 310/58
[51] Int. Cl. ............................................. F42c 11/00
[58] Field of Search ............ 102/70.2 G, 70.2 R, 81, 102/81.2; 310/52, 58, 59

[56] References Cited
UNITED STATES PATENTS

| 2,468,120 | 4/1949 | Senn | 102/70.2 G |
| 2,545,335 | 3/1951 | Becker | 310/52 |
| 3,093,076 | 6/1963 | Blomgren | 102/81.2 X |
| 3,170,403 | 2/1965 | Heilprin | 102/70.2 G |
| 3,689,786 | 9/1972 | Hunt | 310/58 |

Primary Examiner—Samuel W. Engle
Attorney, Agent, or Firm—Holman & Stern

[57] ABSTRACT

Method and means for supporting a rotating body in generators in missiles wherein the rotating body includes a generator rotor, a shaft therefor, bearing means rotatably supporting the shaft, and a turbine wheel mounted on the front end of the shaft. The turbine wheel is driven by ram air meeting the wheel in the axial direction and subjecting the rotating body to an axial load. A bore is provided through the shaft and a pressure chamber is defined rearwardly of the shaft to deflect the ram air approximately 180° passing the same through the bearing means to lubricate and cool the bearings. Any solid particles in the ram air are trapped in the pressure chamber. A radial gap is provided rearwardly of the turbine wheel and forwardly of the rotor to pass the ram air to free air after it has passed through the bearings.

5 Claims, 1 Drawing Figure

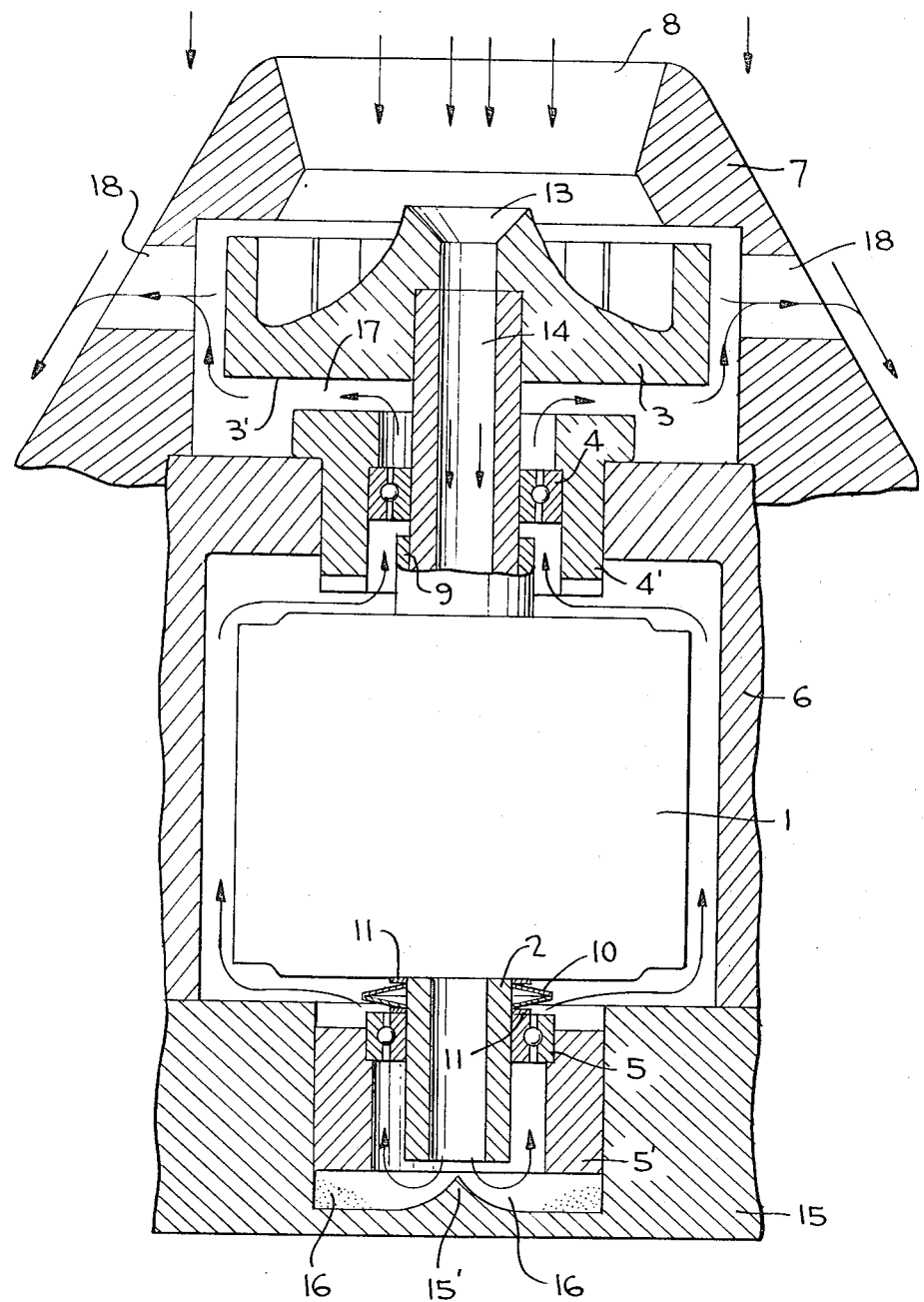

METHOD FOR SUPPORTING A ROTATING BODY IN GENERATORS FOR MISSILES AND A SUPPORTING ARRANGEMENT FOR SUPPORTING SUCH BODIES

The present invention relates to a method for supporting a rotating body in generators in missiles and to a supporting arrangement therefor. Generally, such rotating bodies comprise a generator rotor, a shaft therefor and a turbine wheel mounted on the front of the shaft. Such bodies are driven by ram air which impinges on the wheel in the axial direction, thereby subjecting the rotating body to an axial load.

The operating conditions for such rotating bodies are quite special. The total operating time is short (seconds), but on the other hand, the number of revolutions per minute is extremely high (approximately 100,000–300,000 revolutions per minute). Further, the axial load on the rotating body is significant. During the discharge the rotating body is pressed back with a great force, whereas at the sudden termination of the accelerating force when the missile leaves the discharge tube, it will be thrown forwards due to the forces of inertia. In the trajectory the rotating body will be subject to an axial load from the ram air driving the turbine wheel.

The problems associated with supporting such rotating bodies have therefore proved to be very great. The supporting may not be based on complicated constructions with many movable parts or on a supply of lubricants or the like from separate sources, since an indispensable requirement is operational safety under all conditions and storage ability for extended periods of time. The supporting must therefore be as simple as possible. These requirements are quite difficult to satisfy. Most present supporting arrangements for rotating bodies in generators or dynamos in missiles operate with an unsatisfactory small safety margin, the average time of operation being insignificantly longer than the total time of operation usually required when the missile is discharged.

The basic object of this invention is to provide a method and a device for a supporting arrangement as indicated above, in which the average time of operation is substantially increased and the missile therefore becomes significantly safer.

The invention is based on the realization that with a combined lubrication and cooling of the bearings by means of ram air it is possible to use ball bearings while obtaining a certain balancing of the axial loads which influence the rotating body during the movement in the trajectory.

The method of the invention passes the ram air from the front end of the missile to the rear of the rotating body, where it is deflected approximately 180°, and by means of the dynamic pressure of the ram air is driven in the opposite direction through ball bearings rotatably supporting the rotating body. Thereby a bearing arrangement is achieved which gives a very effective, yet simple, lubrication and cooling of the bearings while also providing a certain balancing of the axial forces to which the rotating body is subjected.

It has been shown that by using a method and a supporting arrangement according to the present invention bearings that otherwise would have a maximum time of operation of approximately 2 minutes at a speed of 250,000 rpm, will now have a lifespan which is 100 times longer, if the other conditions are the same.

The invention will be better understood by reference to the following detailed disclosure which refers to the accompanying drawing in which a fragmentary axial cross-section through a schematic view of a preferred embodiment of the instant inventive concepts will be seen.

The illustrated embodiment shows the rotating body of a generator or dynamo of a missile, comprising a generator rotor 1, a shaft 2 therefor and a turbine wheel 3 which is mounted at the front end of the shaft 2. At its rear side the turbine wheel 3 is provided with radial ridges 3' or the like. The rotating body is supported by two bearings 4, 5, which through sleeves 4' and 5' are mounted in parts 6 and 15 of the housing or stator of the generator or dynamo. The generator is positioned in the front capsule of the missile, and in the drawing there is indicated a section of the capsule bonnet 7 of the missile, provided with a central opening 8 which constitutes an inlet opening for ram air when the missile moves through the air. Some of this air will drive the turbine wheel 3 and exert a rearwardly directed axial force thereon.

The bearings 4 and 5 are standard ball bearings for both radial and axial mounting of the shaft 2. A sleeve 9 is permanently mounted on the shaft 2 at the front end of the rotor, and at the rear end of the rotor there are provided two disc springs 10 between two washers 11. Due to the pressure from the disc springs 10 the front washer 11 will be pressed against the rear end of the rotor 1, whereas the rear washer 11 will be pressed against the rear ball bearing 5. The shaft 2 is displaceably supported in the inner rings of the two ball bearings 4 and 5, and the sleeve 9 serves as a spacer between the shaft 2 and the inner ring of the bearing 4.

Centrally in the turbine wheel 3 there is provided a forwardly directed opening 13 for receiving some of the ram air coming through the opening 8. Furthermore, in the shaft 2 there is an axial throughgoing bore 14 communicating with the opening 13.

The parts 15 and 5' define together with the rear surfaces of the ball bearing 5 a pressure chamber 16 into which the shaft 2 extends. The portion of the part 15 forming the bottom in the pressure chamber 16 is formed with a conically shaped protrusion 15' assisting in deflecting the ram air which is forced into the chamber 16 in such a way that solid particles 16' in the ram air are collected along the peripheral wall of the chamber 16. The protrusion 15' in the part 15 may, especially in rotating missiles, be omitted, as the solid particles 16' in the ram air in rotating missiles will be hurled against the peripheral wall of the chamber 16 due to centrifugal forces.

Between the part 4' and the rear surface of the turbine wheel there is defined a gap 17, and discharge channels 18 are defined in the bonnet 7 of the missile to provide for escape of air.

When discharging takes place the forceful acceleration to which the missile is subjected, causes the rotor 1 to be pressed against the disc springs 10 and bear against the stator housing part 15 with such a large force that a rotation of the rotating body cannot be expected. However, due to the movement of the missile, ram air will flow through the opening 13, through the bore 14 of the shaft 2 and into the chamber 16. The air is deflected in the chamber 16 and thereafter forced through the rear bearing 5 and past the rotor 1 of the generator, through the front bearing 4 and out through the radial gap 17 and the discharge channels 18 to free air.

The air which drives the turbine wheel leaves this at the periphery thereof and flows out into free air through the channels 18. This air has such a direction that it will have a certain suctioning ejector effect on the air in the gap 17. A similar ejector effect is also exercised by the air which flows along the surface of the bonnet 7 and past the discharge channels 18. This effect supports the maintenance of the desired air stream through the bearings.

As soon as the acceleration ceases, i.e., when the missile has left the discharge tube, the powerful contact against the stator part 15 will come to an end, and the disc springs 10 will see to it that the rotor is displaced back to a free position as soon as possible, whereafter the air flow hitting the turbine wheel 3 will rotate the turbine wheel, the shaft and the rotor. At the rear end of the turbine wheel a suctioning effect will thereby be established, and this effect will be amplified by the ridges 3' on the turbine wheel. This causes the already established air stream to increase even if the rotation will entail that a rotating wall of balls in the bearings 4 and 5 is formed, thereby increasing the flow resistance. The air stream gives an effective lubrication and cooling of the bearings 4 and 5, and in passing the bearings the air stream will assist in reducing the axial load to which the bearings are subjected.

An arrangement according to the invention has been tested in a test stand for several hours of operation at a very high speed, and inspection has verified that the bearings, even at such extreme conditions of operation, have become only handwarm.

Also, the supporting device according to the invention excels in that it is built up of simple and sturdy parts suited for mass production. This makes the supporting arrangement economically favorable, while at the same time substantially increasing the average time of operation so that the missile has become substantially more reliable.

We claim:

1. A method for supporting a rotating body in generators in missiles, in which the rotating body comprises a generator rotor, a shaft therefor rotatably supported by bearing means, the shaft including a throughgoing axial bore which at its front end receives ram air, a pressure chamber disposed at the rear end of the shaft, and a turbine wheel mounted on the front end of the shaft and driven by ram air which meets the wheel in the axial direction, thereby subjecting the rotating body to an axial load, said method comprising the steps of:

passing ram air from the front end of the missile to the rear of the rotating body;

deflecting the ram air approximately 180°;

by means of the dynamic pressure of the ram air, driving the ram air in the opposite direction through the bearing means to lubricate and cool the same; and passing the deflected ram air through a radial gap disposed rearwardly of the turbine wheel and forwardly of the rotor to flow out into free air after it has passed through the bearings.

2. A method as defined in claim 1 wherein any solid particles in the ram air are trapped in the pressure chamber before the ram air is passed forwardly through the bearing means.

3. An arrangement for supporting a rotating body in generators and missiles, said rotating body comprising a generator rotor, a shaft therefor, bearing means rotatably supporting said shaft, and a turbine wheel mounted on the front end of said shaft, said turbine wheel being driven by ram air meeting said turbine wheel in the axial direction, thereby subjecting the rotating body to an axial load, said shaft including a throughgoing axial bore which at its front end receives ram air, a pressure chamber at the rear end of said shaft communicating with said bore and defining means for deflecting the ram air received therefrom forwardly through said bearing means to lubricate and cool same, and a radial gap defined rearwardly of said turbine wheel and forwardly of said rotor, said radial gap communicating with free air and receiving the ram air which has passed through said bearing means and passing same into free air.

4. An arrangement as defined in claim 3, further comprising ridge means defined on the rear end of said turbine wheel for providing an additional pressure differential to force ram air through said bearing means.

5. An arrangement as defined in claim 3, wherein said pressure chamber defines means for trapping any solid particles contained in the ram air before the ram air is passed through said bearing means.

* * * * *